(No Model.) 2 Sheets—Sheet 1.

W. V. LA RUE.
PLANTER.

No. 582,210. Patented May 11, 1897.

WITNESSES
Jos. C. Stack
James R. Mansfield

INVENTOR
William V. La Rue.
by Alexander & Dowell
Attorneys (No Model.) 2 Sheets—Sheet 2.
W. V. LA RUE.
PLANTER.
No. 582,210. Patented May 11, 1897.
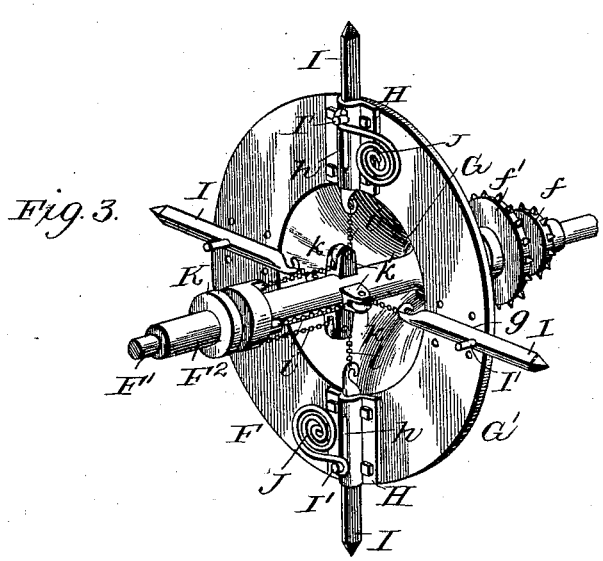
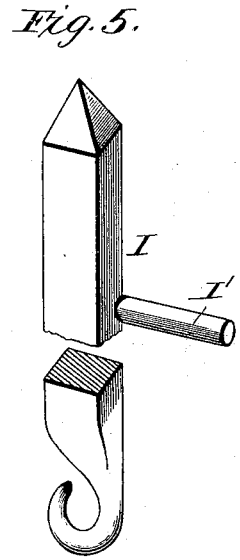
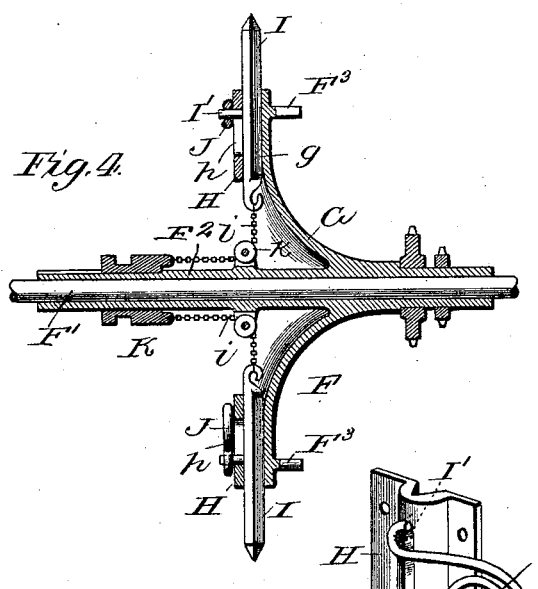
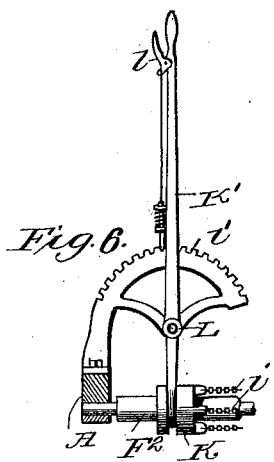
WITNESSES
Jos. C. Stack
James R. Mansfield
INVENTOR
William V. LaRue
by Alexander & Dowe
Attorneys

UNITED STATES PATENT OFFICE.

WILLIAM V. LA RUE, OF DELPHOS, OHIO.

PLANTER.

SPECIFICATION forming part of Letters Patent No. 582,210, dated May 11, 1897.

Application filed August 27, 1896. Serial No. 604,092. (No model.)

*To all whom it may concern:*

Be it known that I, WILLIAM V. LA RUE, of Delphos, in the county of Van Wert and State of Ohio, have invented certain new and useful Improvements in Planters; and I hereby declare that the following is a full, clear, and exact description thereof, reference being had to the accompanying drawings, which form part of this specification.

This invention is an improvement in planters, and is especially designed for corn-planting.

It consists in the novel construction and combination of parts hereinafter described and claimed, and the accompanying drawings illustrate the invention fairly.

Figure 1:
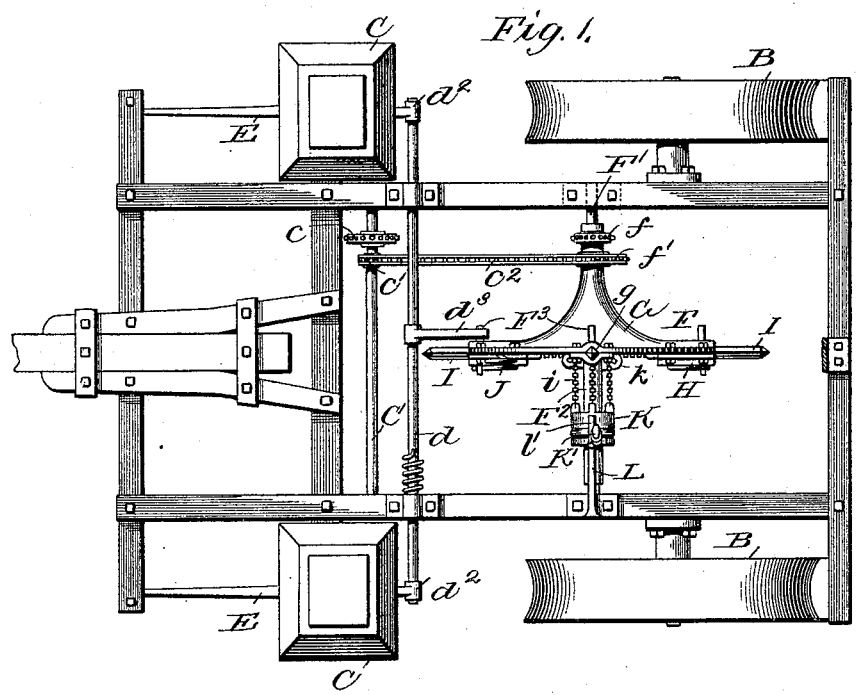
Figure 2:
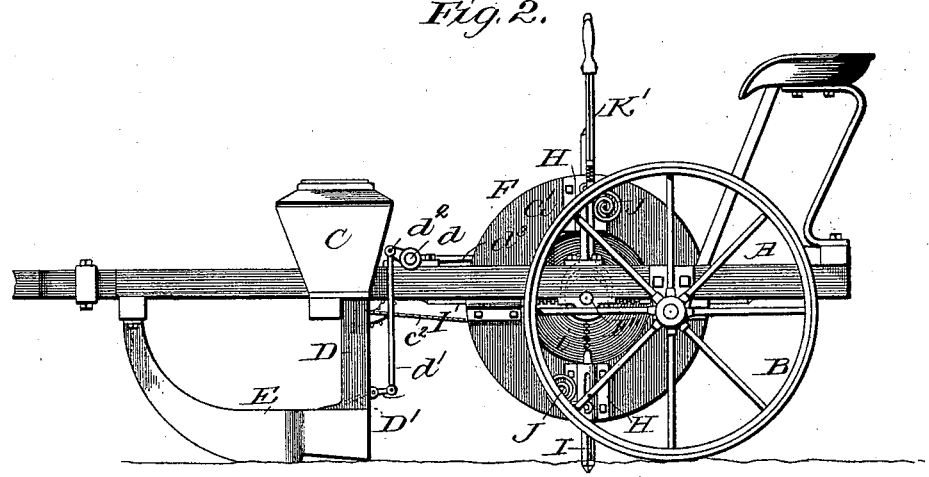

In said drawings, Figure 1 is a top plan view of a corn-planter equipped with my invention. Fig. 2 is a side elevation thereof. Fig. 3 is a perspective view of the spud-wheel detached; Fig. 4, a vertical section through said wheel; Fig. 5, a perspective view of one of the spuds; Fig. 6, a detail of the spud-shifting mechanism, and Fig. 7 a detail view of one of the spring-fastening and spud-guiding plates.

Referring to the drawings by letters, A designates the frame of a corn-planter, of ordinary construction, mounted on wheels B B and having seedboxes C C, below which are the dropping-tubes D and furrow-openers E.

The feeding devices in the seedboxes are of any suitable construction and operated by the rotary shaft C', which is driven by sprocket $c$ or $c'$ and chain $c^2$ from a sprocket $f$ or $f'$ on the hub of the spud-wheel F, which is journaled on a transverse shaft F', secured to the main frame, as shown.

In the lower ends of tubes D are clap-valves D', which are operated from a rock-shaft $d$ on the main frame by means of connecting-rods $d'$ and crank-arms $d^2$, as shown, said rock-shaft being operated by lugs $F^3$ on the spud-wheel striking an arm $d^3$ on the shaft, as shown.

The spud-wheel F consists of a hub portion fitting on shaft F', from which springs a bell-shaped web portion G, having a wide peripheral radial flange G' on its edge, in which are a series (four being shown) of equidistant radial grooves $g$, preferably V-shaped in cross-section. Over these grooves are bolted plates H, which have V-shaped grooves coinciding with those in flange G' and therewith forming sockets or guides for the spuds I, which are angular in cross-section and are radially movable. The spuds are confined in the grooves and limited in their movements by means of pins I', which project through slots $h$ in plates H. Stout coiled springs J are secured at each plate, one end of the spring being fitted in a notch or groove in the plate and clamped between the plate and flange G', while the other end of the spring is caught under the pin I', and thus normally force the spuds outward. Each spud is connected at its inner end to a short chain $i$, which runs under a sheave $k$, journaled between lugs $k'$ on shaft $F^2$, and then to a loose collar K on shaft $F^2$, which collar can be shifted toward or from the hub by means of a lever K', pivoted on a suitable support L, attached to the main frame and having a hand-latch $l$, adapted to engage a segment $l'$ to lock the lever when shifted. By this means the spuds can be simultaneously drawn inward, so as to prevent their engagement with the earth.

On the rear side of flange G' are the lugs $F^3$, as shown.

Operation: The machine being driven to the field, the spuds are released, so that they will be projected by the springs and engage the ground. Consequently as the machine is driven forward the spuds successively engaging the ground rotate the spud-wheel, and motion is imparted continuously to the seedbox dropping-shaft C' by the sprocket and chain connection, which may be made fast or slow by shifting the chain from one set of sprockets to the other. At regular intervals the lugs $F^3$ on the spud-wheel strike arm $d^3$ and rock-shaft $d$, allowing the grain in the spouts to drop into the furrows, which may be covered in by the wheels in the usual manner. When the spuds strike an obstruction, they can move inward and yet maintain sufficient bite to cause the spud-wheel to rotate. When it is not desired to plant at any point or time, the driver can shift lever so as to pull the spuds inward and prevent their engaging the ground, consequently stopping the seeding operation.

Preferably I locate the spud-wheel at about the center of the machine, so that it will not be seriously affected by turning or lateral oscillations of the machine. I do not, however, confine myself to the location of the wheel, as it may be placed at any point found desirable by the manufacturer or best suited for the kind of planting to be accomplished by the machine.

Having thus described my invention, what I therefore claim as new, and desire to secure by Letters Patent thereon, is—

1. In a planter the combination of the main frame, the seed-spouts, the valves thereon, and the rock-shaft and connections for operating said valves; with the spud-wheel, provided with retractile spuds, and with lugs adapted to strike an arm on the rock-shaft to rock the latter for the purpose and substantially as described.

2. In a planter, the combination of the main frame, the seedboxes, the rotary shaft for the seed-feeding devices; the seed-spouts, valves on said spouts, a rock-shaft and connections between said shaft and spout-valves whereby the latter are operated by the rocking of the former; with the spud-wheel gearing between the hub of said wheel and the rotary shaft, and lugs on said wheel adapted to strike an arm on the rock-shaft to rock it, all substantially as and for the purpose described.

3. The combination of the spud-wheel, the radially-movable spuds thereon, springs for projecting said spuds, and means for simultaneously retracting said spuds at the will of the operator, substantially as and for the purpose described.

4. The combination of the spud-wheel having a flange G' provided with radial grooves, and grooved plates fastened to said flange over the grooves; with spuds slidably mounted in said grooves having pins working in slots in the plates to limit their play; and springs for normally projecting said spuds, for the purpose and substantially as described.

5. The combination of the spud-wheel having a flange G' provided with radial grooves, the grooved and slotted plates H bolted to the flange over the grooves; the radially-movable spuds I playing in the grooves having pins I' projecting through the slots in the plates; and the coiled springs J having one end confined between the plate and flange, and the other end engaging pin I' to project the stud, for the purpose and substantially as described.

6. The combination of the spud-wheel having a flange G' provided with radial grooves, and grooved plates fastened to said flange over the grooves; with spuds slidably mounted in said grooves having pins working in slots in the plates to limit their play; and springs for normally projecting said spuds; with the rotatable collar, chains and sheaves, and lever substantially as described whereby said spuds can be simultaneously retracted for the purpose and substantially as described.

7. The herein-described planter consisting of the wheeled frame having seedboxes, furrow-openers and seed-spouts, valves on the seed-spouts, a rock-shaft and connections between said rock-shaft and valves; and a rotary shaft for operating the seeding mechanism in the boxes; with the spud-wheel F having radially-movable spuds I, springs for projecting said spuds, and means for simultaneously retracting all the spuds; lugs on said wheel adapted to engage an arm on the rock-shaft to operate said shaft; and sprockets and chains for transmitting motion from said spud-wheel to the rotary shaft, all constructed and arranged to operate substantially as and for the purpose set forth.

In testimony that I claim the foregoing as my own I affix my signature in presence of two witnesses.

WILLIAM V. LA RUE.

In presence of—
G. J. BAXTER,
H. G. STEMEN.